United States Patent [19]

Aldrich et al.

[11] Patent Number: 4,731,936

[45] Date of Patent: Mar. 22, 1988

[54] GAUGING SYSTEM FOR VEHICLE ALIGNMENT EQUIPMENT

[75] Inventors: Roger B. Aldrich; John R. Dahlstrom, both of Grand Island, Nebr.

[73] Assignee: Chief Automotive Systems, Inc., Grand Island, Nebr.

[21] Appl. No.: 787,963

[22] Filed: Oct. 16, 1985

[51] Int. Cl.$^4$ .............................................. G01B 5/00
[52] U.S. Cl. ........................................ 33/608; 33/288
[58] Field of Search ............ 33/180 AT, 181 AT, 288, 33/286, 608; 72/705

[56] References Cited

U.S. PATENT DOCUMENTS

| | | |
|---|---|---|
| Re. 31,636 | 7/1984 | Chisum . |
| 3,630,066 | 12/1971 | Chisum . |
| 3,869,804 | 3/1975 | Friend .................................... 33/288 |
| 4,165,567 | 8/1979 | Olsson . |
| 4,207,681 | 6/1980 | Bayo geon et al. . |
| 4,302,883 | 12/1981 | MacGregor . |
| 4,342,154 | 8/1982 | Legrand . |
| 4,366,624 | 1/1983 | Bergstrom . |
| 4,442,608 | 4/1984 | Clausen ................................. 33/288 |
| 4,479,305 | 10/1984 | Wendl et al. . |
| 4,490,918 | 1/1985 | Clausen . |
| 4,513,508 | 4/1985 | Jarman et al. . |
| 4,517,748 | 5/1985 | Rudolph ........................ 33/180 AT |
| 4,523,384 | 6/1985 | Giacomini .................... 33/180 AT |
| 4,539,758 | 9/1985 | Riutta ............................ 33/180 AT |
| 4,621,435 | 11/1986 | Higginbotham .................. 33/288 X |

OTHER PUBLICATIONS

Pamphlet Entitled "Damage Analysis the Right Way from Chief", Chief Automotive Systems Division, Chief Industries, Inc., Grand Island, Neb.
One Page Advertisement "Chief E-Z Liner II-Accurate, Universal, Unitized Body Repair", Chief Automotive Systems Division, Chief Industries, Inc., Grand Island, Neb.
Automotive Body Repair News, Jun. 1985–One Page, (Picture of Continental's Universal Measuring System).
One Page Advertisement "And Introducing the Best of Both Worlds . . . The Metro 2000 Measurement System", Celette Limited, Summerville, S.C.
One Page Advertisement "Finally . . . An Affordable Uni-Body Measuring System–Check-Mate", Steck Manufacturing Co., Inc., Dayton, Ohio.
Pamphlet Entitled "Blackhawk-Universal Measuring Systems", Applied Power, Inc., Milwaukee, Wisc.
Pamphlet Entitled "Bee Line Accu-Trak-Universal Precision Measuring System", Bee Line Alignment Equipment, Division of McLaughlin.
Pamphlet Entitled "Accu-Trak Universal Precision Measuring System", Buske Industries, Inc., Gowrie, Iowa.
Pamphlet Entitled "Car-O-Liner Mk III", Car-O-Liner Company.
One Page Advertisement Entitled "Speed-Eze-Universal Measuring System", Speed-Eze Corporation.
One Page Advertisement Entitled "On Target Measuring System", Detroit Auto Body Equipment.
Pamphlet Entitled "The Continental Angle Measures Up to Profits", Continental Collision Repair Systems, Alexandria, Minn.
Catalog Pages-"Exacto 3D Gauging System", Chart Industries, Inc. (pp. 16 and 17).

Primary Examiner—Harry N. Haroian
Attorney, Agent, or Firm—Allegretti, Newitt, Witcoff & McAndrews, Ltd.

[57] ABSTRACT

An improved measuring system for use in combination with vehicle repair equipment includes a pair of transverse bars mounted at a fixed position in space relative to the vehicle with a longitudinally extending and laterally movable bar assembly attached by sliding brackets to the transverse bars. Additional longitudinal bars are attached to the opposite ends of the transverse bars. Supplemental measuring equipment is attachable to all of the bars in order to effect point to point measurements on a vehicle in order that the point to point measurements may be compared with known standards.

7 Claims, 9 Drawing Figures

GAUGING SYSTEM FOR VEHICLE ALIGNMENT EQUIPMENT

BACKGROUND OF THE INVENTION

This invention relates to apparatus for measuring the location of reference points on a damaged vehicle and for determining the extent of deviation of such reference points from set or known standards.

Various apparatus or equipment are known for correcting misalignment of vehicles and for returning frame and body members of vehicles back to their predamaged locations. Equipment of this nature is utilized by personnel in body shops and other service and repair shops. Typical of such equipment is the apparatus disclosed in U.S. Pat. No. 3,360,066 entitled "Apparatus for Returning Vehicle Body and Frame Components to Their Original Locations During Repair and Servicing of Vehicles", issued Dec. 28, 1971, and U.S. Pat. No. Re. 31,636 entitled "Auto Body and Frame Straightening Device", reissued July 1, 1984 on a patent issued June 10, 1975. Both of the referenced patents are incorporated herewith by reference.

The effective use of such equipment in the process of applying pulling forces to a vehicle body is enhanced by various gauging and measuring systems that provide an indication of the magnitude of misalignment or deviation of the component parts of the vehicle body to an operator of the alignment equipment. There are many such measuring systems that have been disclosed in prior art patents including the following:

| U.S. Pat. No. | Inventor | Title | Issue Date |
|---|---|---|---|
| 3,869,804 | Friend | Vehicle Frame Alignment Gage | 3/11/75 |
| 4,165,567 | Olsson | Checking and Measurement Device for Automotive Chassis | 8/28/79 |
| 4,207,681 | Bayorgeon, et al | Vehicle Measuring Bridge | 6/17/80 |
| 4,302,883 | MacGregor | Vehicle Frame, Body and Wheel Alignment Gauge | 12/1/81 |
| 4,342,154 | Legrand | Measuring Bridge | 8/3/82 |
| 4,366,624 | Bergstrom | Arrangement for Benches for Measuring and Straightening Vehicles | 1/4/83 |
| 4,479,305 | Wendl, et al | Measuring Bridge | 10/30/84 |
| 4,490,918 | Clausen | Vehicle Frame Measurement Device | 1/1/85 |
| 4,513,508 | Jarman, et al | Vehicle Body and Frame Measuring Device | 4/30/85 |
| 4,523,384 | Giacomini | Method and Apparatus for Measuring Deviations in Vehicle Bodies or Frames | 6/18/85 |

Typically, the prior art patents disclose a framework which is attached to a vehicle body or to a platform which supports a vehicle body. The framework includes various scales and associated slidable or fixed pointers thereon. The pointers may be aligned with selected reference points of the vehicle body. The distance between a selected reference point and a fixed, known reference point is then measured. If the measured distance varies from known specifications, then the selected reference point is not in the required or standard position. Frame straightening equipment may then be utilized to bend and reform the vehicle body and thereby move the selected reference point to its required or standard position.

The prior art patents generally teach various types or arrays of pointers which are directed or positioned over the selected reference points. Relative differences in the position of the pointers can be utilized to gauge or measure the position of reference points. Additionally, such apparatus may include slidable members or auxiliary gauges which are attached to the framework in a position which permits measurement of reference points at the side and top of a vehicle.

While such measuring systems have proven to be useful, they require significant time to be properly attached to a vehicle. Additionally, many systems are cumbersome because of their multiple component parts. Many measuring systems are limited in their application to certain vehicles because of the particular size or construction of the framework of the measuring system.

Many systems utilize light or laser beams in combination with the framework in order to effect measuring of reference points. Some of these systems have proven to be expensive or fragile.

Thus, a need has remained for an improved apparatus for measuring or gauging the location of selected reference points on a vehicle particularly an apparatus which can be used easily in combination with various types of equipment for straightening of bodies or frames of vehicles.

SUMMARY OF THE INVENTION

Briefly the present invention comprises an improved system or apparatus for measuring the location of selected reference points on a vehicle relative to selected or standard datum planes or other reference points on the vehicle.

The system preferably includes a pair of transverse or lateral bars which are affixed to the vehicle or to a platform supporting the vehicle. The bars are aligned transverse to the longitudinal axis of the vehicle and are horizontally spaced from one another. A longitudinally extending measuring bar member extends generally parallel to the longitudinal axis of the vehicle and is attached by roller brackets to both of the transverse members for sliding movement parallel to the longitudinal axis. At least one reference point position indicator is attached to the longitudinally extending measuring bar member and is preferably slidable on the longitudinal measuring bar member. Scales are provided on all the bar members. By moving the slidably mounted longitudinally extending measuring bar member as well as the reference point indicator, it is possible to measure with great precision the position of various reference points on the vehicle relative to one another and relative to selected or standard datum planes. Further attachments including longitudinal bars may be attached to the transverse bars in order to enhance the structural integrity of the measuring system and provide support for additional reference point indicators and measuring apparatus.

Thus, it is an object of the invention to provide an improved measuring system for locating selected reference points on a vehicle and for indicating the position of such reference points with respect to other such reference points on the vehicle or with respect to standard datum planes associated with the vehicle.

A further object of the present invention is to provide an improved apparatus for measuring the location of reference points on the vehicle which can be easily incorporated for use with vehicle straightening equipment.

Yet another object of the invention is to provide an improved apparatus or system for measuring the location of selected reference points on a vehicle that incorporates a pair of fixed transverse bars and a slidably attached longitudinal bar mounted on the transverse bars.

Yet a further object of the invention is to provide an improved apparatus for measuring the location of selected reference points on a vehicle which is easily assembled and disassembled, which has a rugged construction, which provides an immediate indication of selected positions and reference points, and which is economical.

Yet another object of the present invention is to provide an improved apparatus for measuring the location of selected reference points on a vehicle which is easy to use and which can be operated in an exceptionally fast manner, which is unobtrusive and which does not interfere with frame straightening equipment when used in combination with such equipment, and which has the fewest number of parts while providing a means for locating the maximum number of selected reference points.

These and other objects, advantages and features of the invention will be set forth in the detailed description which follows.

BRIEF DESCRIPTION OF THE DRAWING

In the detailed description which follows, reference will be made to the drawing comprised of the following figures.

DESCRIPTION OF THE PREFERRED EMBODIMENT

Figure 1:
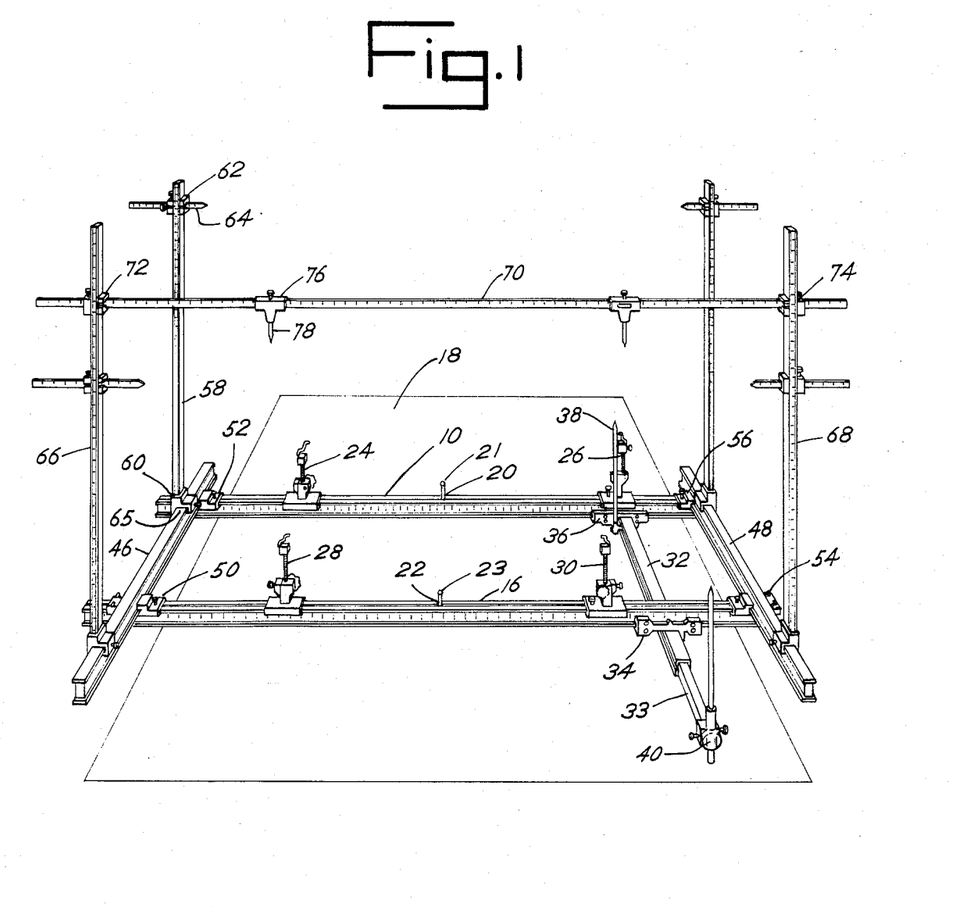
FIG. 1 is a perspective view of the improved measuring apparatus of the invention.
Figure 2:
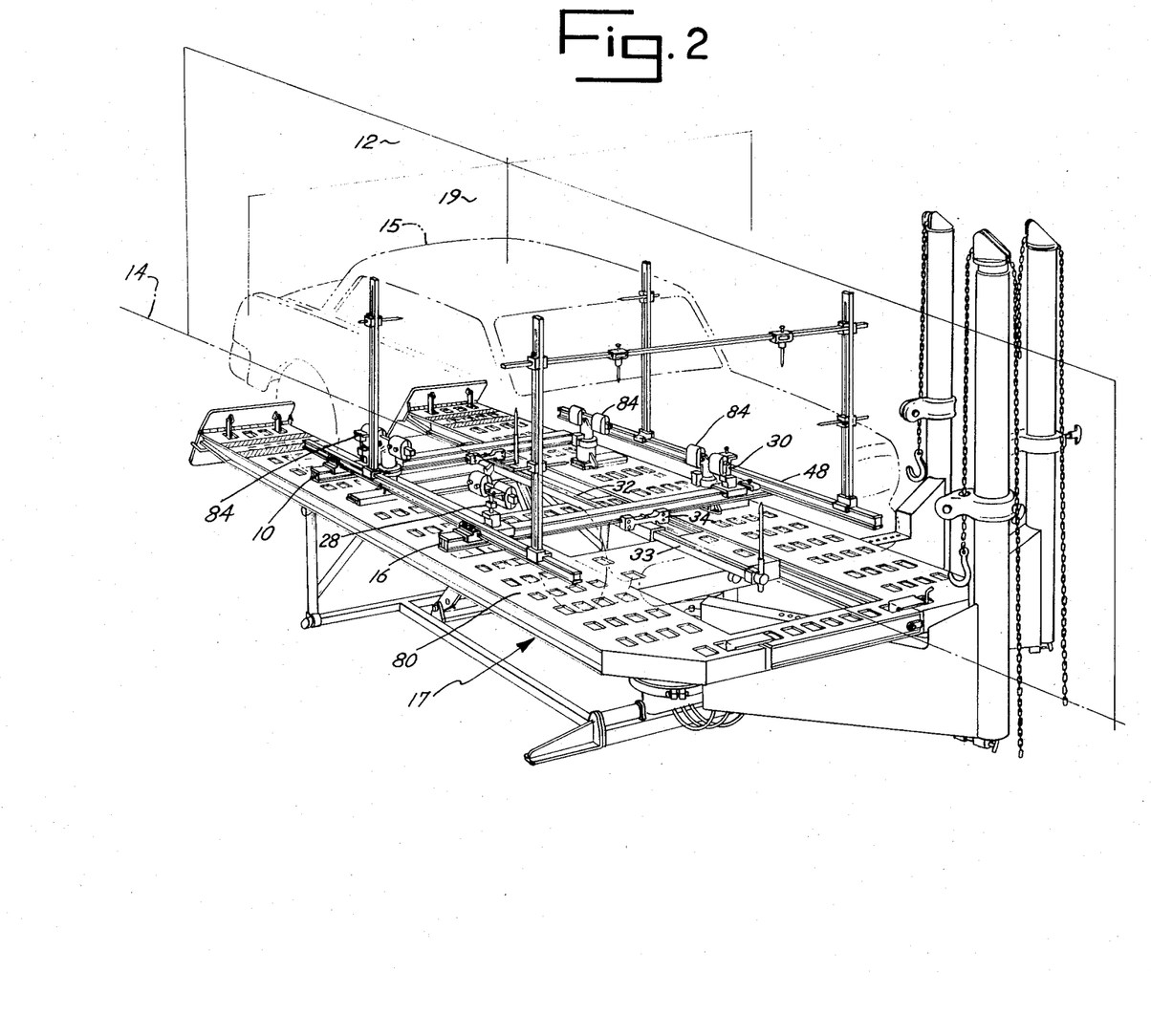
FIG. 2 is a perspective view of the improved measuring apparatus of the invention incorporated with and positioned on vehicle frame straightening equipment.

The measuring system of the invention comprises a number of linear frame members which are interconnected in a unique fashion to provide a means for measuring the location of various reference points on a vehicle. FIGS. 1 and 2 depict the overall construction of the measuring system or apparatus. In FIG. 1 the system is depicted as a free standing framework separate and apart from vehicle straightening equipment. In FIG. 2, the measuring system of FIG. 1 is depicted in combination with vehicle frame straightening equipment and with a vehicle shown in phantom with respect to the measuring system. The remaining figures depict various details and features of the overall system depicted in FIGS. 1 and 2.

System Overview

Referring to FIGS. 1 and 2, the measuring system of the invention is comprised of a first or rear transverse bar or lateral bar 10 which, when in use, is arranged or positioned so that it will be substantially perpendicular to a vertical plane 12. Plane 12 defines or includes a longitudinal axis 14. The vertical plane 12 and the longitudinal axis 14 are oriented with the longitudinal center line axis of a vehicle 15. Plane 12 and axis 14 are defined merely for purposes of explanation of the invention and are defined relative to a vehicle 15 which is mounted on frame straightening equipment 17 for repair.

A second transverse bar 16 is horizontally spaced from the first transverse bar 10 and arranged substantially parallel thereto. Thus, the second transverse bar 16 likewise is perpendicular to and intersects the vertical plane 12 and is also transverse to the longitudinal axis 14. The first transverse bar 10 and second transverse bar 16 define a generally horizontal plane 18 which may be referenced as a datum or datum plane 18.

It is known that a vehicle 15 and more particularly the body or frame of a vehicle for every model and make of vehicle has a number of reference points which are measured with respect to one another and with respect to a horizontal base or datum plane as well as with respect to various vertical planes through the vehicle. Vertical plane 19 in FIG. 2 as well as plane 12 may serve as vertical datum planes for a vehicle. Typically these measurements are in millimeters and are published in reference materials available to vehicle repairmen.

Each bar 10 and 16 includes a midpoint 20 and 22, respectively with an associated removable pin 21, 23 at the midpoint projecting vertically. The bars 10 and 16 are substantially equal in length and include a tape measure with scales thereon for determining the transverse distance from the respective midpoint 20, 22 in inches, centimeters or millimeters. Preferably a scale is provided on each side of each of the bars 10 and 16.

Each transverse bar 10 and 16 is supported in space substantially rigidly by an appropriate pair of spaced brackets. Thus, spaced brackets 24 and 26 support transverse bar 10. Spaced brackets 28 and 30 support transverse bar 16. Each bracket 24, 26, 28 and 30 is adjustably mounted on the respective bars 10 and 16, and each bracket 24, 26, 28, 30 is adjustable with respect to its connection from the associated bar 10 and 16 to a vehicle 15 or platform 80. Thus, the bars 10, 12 are supported in space at two spaced positions each of which is adjustable and has three degrees of freedom; i.e., along an x, Y and z axis through the position. The amount of adjustment is indicated by various linear scales on the brackets 24, 26, 28, 30 or bars 10, 16 in the x, y and z direction associated with the adjustment mechanisms.

In review, the brackets 24, 26, 28, 30 may be spaced a desired distance from one another on the transverse bars 10 and 16, and the attachment of the brackets 24, 26, 28, 30 to some structure such as a vehicle 15, a platform 80, or a clamp attached to a vehicle 15 is adjustable in order to thereby adjust the position in space of the transverse bars 10 and 16. In this manner, the transverse bars 10 and 16 may be aligned with respect to one another and with respect to various reference points and planes, i.e. 12, 14, 18 to which the bars 10, 16 are positioned by means of the brackets 24, 26, 28, 30. The transverse bars 10 and 16 define a substantially horizontal plane which may be a datum plane 18 or a plane 18 which is parallel to a datum plane as defined by printed reference works.

A longitudinally extending bar or member 32 is supported by roller brackets 34 and 36 on the transverse bars 10 and 16. The longitudinal bar 32 is parallel to the longitudinal axis 14. The roller brackets 34 and 36 support the longitudinal bar 32 while maintaining the longitudinal bar 32 at perpendicular or right angles to the transverse bars 10 and 16. The roller brackets 34, 36 permit the longitudinal bar 32 to move laterally in either direction from the vertical plane 12. The amount of lateral movement can be measured by means of the scales previously described.

Position indicators such as position indicator 38 may be mounted on the longitudinal bar or member 32. Indicator 38 is slidable on bar 32 in the longitudinal direction. The longitudinal bar 32 preferably includes a secondary bar 33 telescoped into the bar 32. Another indicator 40 is attached to the end of the telescoped bar 33 and moves therewith. The position indicators 38 and 40 may be aligned with appropriate reference points on a vehicle and then the spacing between those reference points in the longitudinal direction can be determined. A unique tape measuring system is associated with the bars 32, 33 to provide measurements between the points on the separate bars 32, 33.

The position indicators 38 and 40 may include scaled pointers or rods 42 and 44 which provide a measure of the distance from the longitudinal bar 32 vertically upward or at any angle from that bar 32. This provides an indication of the distance of a reference point from the datum plane or horizontal plane 18.

First and second additional longitudinal bars 46 and 48 are attached by clamps 50, 52, 54 and 56 to the outside ends of the transverse bars 10 and 16. Thus, an additional straight longitudinal bar 46 is fastened to one outside edge or end of the first and second transverse bars 10 and 16 by means of clamps 50 and 52. The longitudinal bar 46 is parallel to the longitudinal axis 14 and is rigidly connected to the transverse bars 10, 16 to define right angles therewith. The longitudinal bar 46 thus facilitates stabilization of the measuring frame. Further, supplementary measuring apparatus may be attached to the longitudinal bar 46 for measuring additional reference points on the vehicle.

The second longitudinal bar 48 is rigidly attached to the opposite side of the transverse bars 10 and 16 by clamps 54 and 56. The transverse bars 10 and 16 and longitudinal bars 46 and 48 define a rectangular frame which may be suspended from or attached to a vehicle 15 or a platform 80 for support of a vehicle 15 which is to be straightened by vehicle straightening equipment 17.

Supplemental measuring apparatus may be slidably attached to the longitudinal bars 46 and 48. For example, a vertical measuring bar 58 may be attached by an adjustable clamp 60 to the longitudinal bar 46. The vertical measuring bar 58 includes scales thereon for measuring the vertical distance above the datum base 18 defined by the transverse bars 10 and 16. A sliding clamp 62 may be attached to the measuring bar 58 with an additional pointer 64 having scales thereon for alignment with vehicle reference points.

A pair of vertical measuring bars 66 and 68 situated in opposed relation on the parallel, spaced longitudinal bars 46 and 48 may support sliding clamps 72 and 74 that retain a transverse, scaled measuring rod 70. Additional sliding clamps such as clamp 76 on measuring rod 70 with an adjustable pointer 78 may be utilized to further locate positions above the datum plane 18 and relative to vertical planes such as planes 12 and 19 as well as axis 14.

As can be seen by reference to FIG. 2, with the measuring apparatus of the present invention, it is possible to position various pointers with any reference point on a vehicle attached to a mounting platform 80. Thus a vehicle 15 may be supported on a platform 80 by support clamps 84. A vehicle support clamp 84 of the type shown in U.S. Pat. No. 4,344,314 issued Aug. 17, 1982 for an Alignment Apparatus may be used. U.S. Pat. No. 4,344,314 is incorporated herewith by reference. Platform 80 is, in the embodiment depicted, associated with frame straightening equipment of the type disclosed in U.S. Pat. Nos. 3,630,066 and Re. 31,636.

The measuring framework depicted in FIG. 1 can then be attached to the platform 80 or to vehicle 15 at known reference points or to the support clamps 84. The brackets 24, 26, 28 and 30 serve as the means for attaching the measuring framework or system to either the platform 80, vehicle 15, or support clamps 84. Various reference points on the vehicle 82 can then be measured with respect to the horizontal plane or datum 18, as well as the vertical plane 12 or axis 14 or with respect to one another or with respect to various transverse vertical planes 19 for which reference book data is available.

In practice, the datum plane 18, vertical planes 12 and 19, and axis 14 are associated with a vehicle 15. Thus, the system or framework is positioned with respect to vehicle 15 so as to align the framework with vertical planes 12 and 19, axis 14 and datum 18. Specifically the midpoints 20, 22 are positioned parallel to datum 18 as well as within plane 12 parallel to axis 14.

Measurements are made by reading the scales on the various bars which are fixed with respect to the vehicle 15 as well as the differences in the distances as measured by movement of the bars or pointers attached to the movable longitudinal bar 32 and telescoping member 33 and the various sliding brackets attached to that movable longitudinal bar 32.

With this general overall description of the construction of the measuring apparatus, a further description will be provided with respect to each of the component parts.

Transverse (Lateral) Bars

Figure 3:
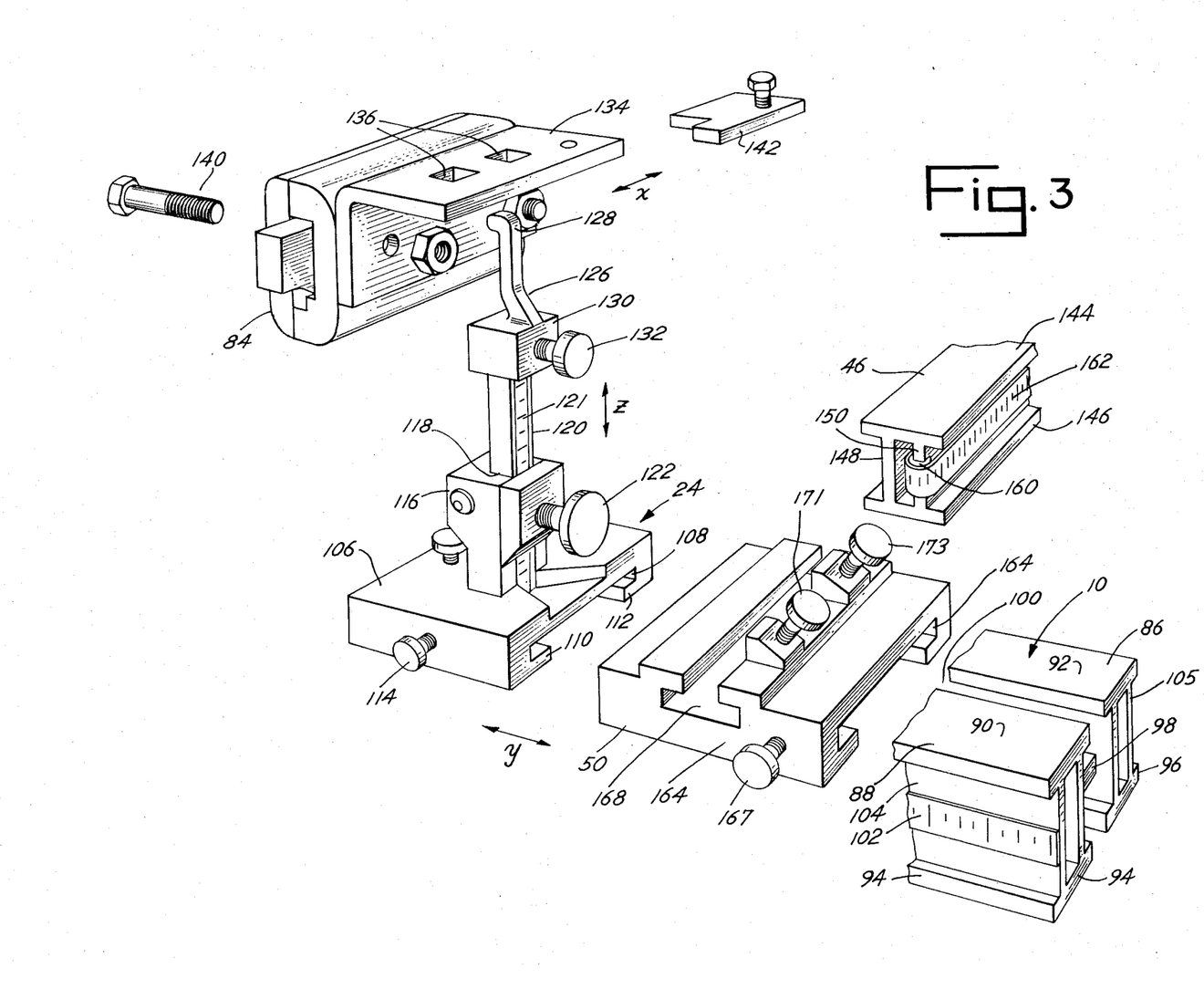
FIG. 3 is an enlarged perspective view of a vehicle support clamp associated with frame straightening equipment and an attached transverse bar associated with the measuring apparatus of the present invention.
Figure 9:
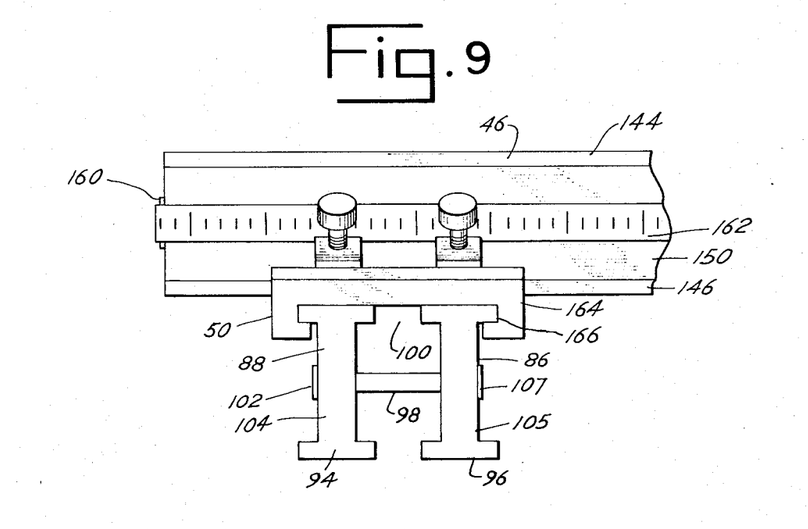
FIG. 9 is an enlarged side view of a fixed longitudinal bar member attached to the transverse or lateral bars.

Referring to the remaining figures, particularly FIGS. 3 and 9, attention is first directed to the construction of the transverse bars 10 and 16 and the associated brackets 24, 26, 28 and 30 which are attached to the bars 10, 16 and which support the bars 10, 16 in a generally fixed position in space relative to the vehicle 15 being supported by the frame straightening equipment 17.

Each bar 10 and 16 is comprised of a pair of extruded aluminum beams having the cross sectional shape of an I-beam. Thus beams 86 and 88 each having an I-beam cross sectional shape are arranged in parallel, side by side array with upper flanges 90 and 92 of beams 88, 86 respectively, and lower flanges 94 and 96 of beams 88, 86 respectively, arranged to define separate planes. The beams 86 and 88 are rigidly held together by a brace or bracket such as bracket 98 thereby defining a slot 100 between the beams 86 and 88.

A measuring scale 102 is affixed to the exposed planar surface of the web 104 which joins the flanges 90 and 94 of beam 88. Thus, in use the scale 102 is aligned to be perpendicular to the vertical plane 12 and the longitudinal axis 14 so that measurements on the scale 102 constitute precise indications of the distance from the vertical plane 12 along the bar 10. A scale 107 is also provided on the web 105 of beam 86.

Transverse Bar Bracket

Inasmuch as all of the brackets 24, 26, 28, 30 have substantially the same construction and are used in substantially the same manner, only one bracket 24 will be described in detail. Thus, referring to FIG. 3, the bracket 24 is adapted to support a transverse bar 10 and cooperate with planar flanges 90 and 92 of the bar 10. The bracket 24 includes a bracket body 106 with a transverse slot 108 extending therethrough. Slot 108 defines spaced flanges 110 and 112 which cooperate with flanges 90 and 92 respectively so that the body 106 will slidably fit over the bar 10. The flanges 90, 92 and 94, 96 are all sized and dimensioned so that the body 106 may cooperate with either set of flanges and thus the bracket 24 can be mounted to extend vertically upward or downward to support bars 10, 16.

A set screw 114 or similar locking mechanism is utilized to lock the bracket 24 and in particular the body 106 against the flanges such as flange 90 in FIG. 3. Thus, a set screw or thumb screw 114 will lock the bracket 24 in a fixed position in the transverse direction or lateral direction on the bar 10.

Affixed to the body 106 is a bracket hub 116 which projects upwardly from the body 106. The bracket hub 116 includes a central, rectangular cross section passage 118 which receives a longitudinally extending rectangular cross section slidable rod 120. The rod 120 projects downwardly through the passage 118 defined in the body 106 and into the slot 100 between the flanges 90 and 92. The rod 120 has gear teeth along one side or edge to define a rack which is cooperative with a pinion which is retained within the hub 116. The pinion is driven by a rotatable knob 122. The rod 120 thus may be projected in a vertical direction upwardly or downwardly in the slot 100. Scales 121 along one side of the rod 120 may be utilized to provide a relative measurement of the extension of the rod 120 in the passage 118 and thus provide an indication of the position of the transverse or lateral bar 10 relative to the attachment point of the bracket 24 to a vehicle 15.

The rod 120 cooperates with a hook assembly 126. The hook assembly includes a hook 128 which projects vertically upward from a block 130 that is attached by a thumb screw arrangement 132 to the rod 120.

The hook 128 is adapted to cooperate with a bracket 134 that includes a series of parallel openings 136. The bracket 134 is attached to a vehicle support clamp 84 and retained on that clamp 84 by bolts 140. The vehicle support clamp 84 may be of the type disclosed in U.S. Pat. No. 4,344,314 previously referenced. A retaining plate 142 cooperates with the hook 128 and is threadably attached to the bracket 134 to hold the hook and thus the entire bracket 24 in position with respect to the clamp 84.

The hook 128, because of its ability to cooperate with any of a series of slots 136, permits adjustment of the bracket 124 in the x axial direction or the direction of the longitudinal axis 14. Operation of the knob 122 provides for adjustment of the bracket 124 in the z or vertical direction. The entire bracket 124 is slidable on the bar 10 to provide for adjustment in the y direction.

In addition to attachment of the hook 128 to a bracket 134 associated with a vehicle clamp 84, it is also possible that the hook 128 can be attached directly to a reference point such as a reference opening in the body of a vehicle 15. Alternatively, the bracket 24 may be attached to the platform 80 or other part of vehicle straightening equipment 17 rather than to a vehicle 15 directly.

Auxiliary Longitudinal Measuring Bars

The additional or auxiliary longitudinal measuring bars 46 and 48 are each constructed in similar fashion. Thus, the description with respect to one of these bars 46 applies to both bars 46 and 48.

Referring to the figures, the bar 46 includes a generally planar upper flange 144 and a parallel, similarly sized lower flange 146. A pair of spaced webs 148 and 150 join the flanges 144 and 146 to define a generally I-beam shaped bar 46. The webs 148 and 150 are, however, spaced one from the other with a cylindrical roller 160 situated at each end thereof. Thus, a roller 160 is situated at one end of the bar 46.

A closed loop tape 162 with a scale fits over the roller 160 and over an identical roller at the opposite end of the bar 46. The tape 162 slides along a track defined in the web 150. When in use, the tape 162 is moved along the web 150 to a position which aligns a zero scale setting on the tape 162 with a desired reference point. Measurements may then be taken from this zero reference point in either direction along the bar 46 to provide an indication of the distance between the zero reference point and other reference points in the x direction or longitudinal direction.

The bar 46 cooperates with a mounting bracket or clamp 50. The clamp 50 includes a body 164 which has a transverse slot 166 on one side and a longitudinal slot 168 on its opposite side. The transverse slot 166 is shaped and sized in the same manner as slot 108. Thus, transverse slot 166 is designed to cooperate with the flanges 90 and 92 of bar 10. In similar fashion, the bracket or clamp 50 is retained by a set screw or thumb screw 167 on the bar 10.

The longitudinal slot 168 is shaped to receive the flange 146 of longitudinal bar 46. A pair of rotatable clamping members 171, 173 may be rotated to impinge through the clamp 50 and hold the bar 46 rigidly in position in the slot 168.

Slidable and Telescoping Longitudinal Measuring Bar Assembly

As shown in FIGS. 5-8, the longitudinal measuring bar assembly includes a generally rectangular longitudinal measuring bar 32 and a secondary bar 33 which telescopes from the bar 32. The bar 32 includes a longitudinal slot 170 in one side thereof which connects with a channel 175 that receives a sliding plate 172. A sliding plate 172 is provided for cooperation with each roller bracket 34 and 36. However, the description will reference bracket 34 inasmuch as the connection between the bar 32 and each bracket 34, 36 is the same.

Thus, roller bracket 34 includes a depending brace 177 having a rib 176 which fits into slot 170. A threaded bolt or rod 178 extends from plate 172 through brace 177 and is held by nut 180 to tightly attach the bar 32 to the bracket 34.

Figure 4:
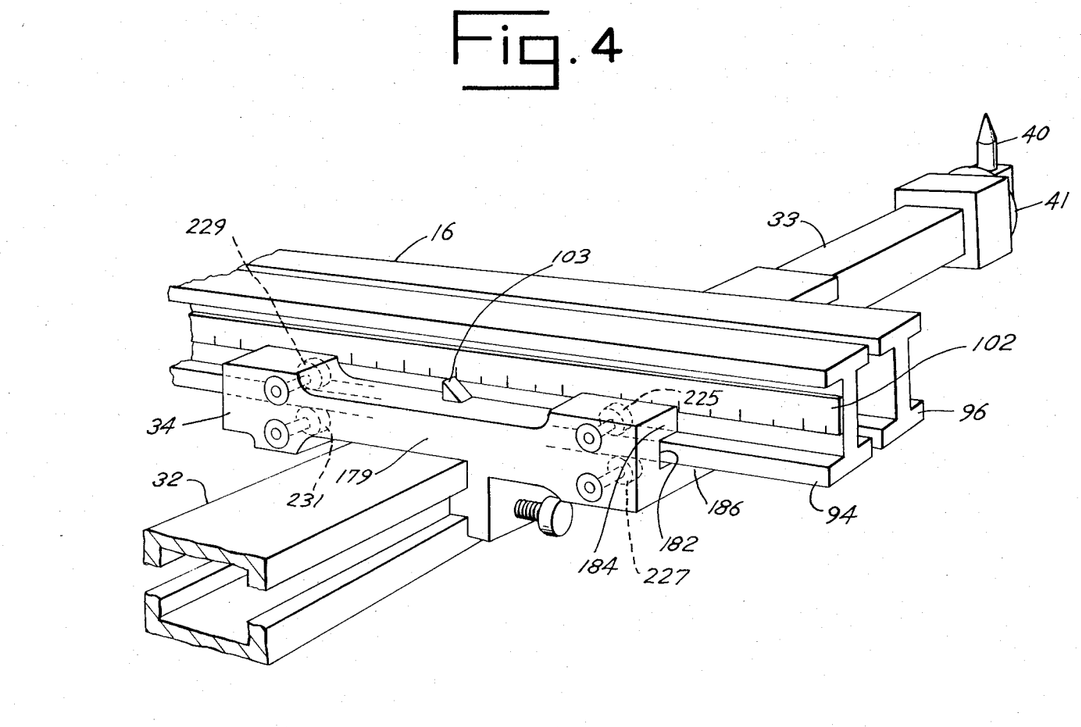
FIG. 4 is an enlarged perspective view of the slidable longitudinal measuring bar member of the apparatus for measuring.

Bracket 34 is comprised of a body 179 which defines a slot 182 having spaced flanges 184 and 186. The slot 182 is adapted to receive flanges 94 and 96 associated with lateral bar 10. Roller bearings (225, 227, 229, 231 in FIGS. 4 and 5) are provided on the inside surface of slot 182 so that the interior of the slot 182 can easily slide over the flanges 94, 96 of the bar 10 and also easily move in a direction transverse to the plane 12 and axis 14. Importantly, the bracket 34 is held in a sufficiently rigid manner so that the bar 32 maintains its perpendicular alignment with axis 14 when the bar 32 moves. In this manner, the entire assembly comprising the bars 32, 33 and the trolley brackets 34, 36 can move together in unison and in precise parallel alignment with the axis 14.

Figure 5:
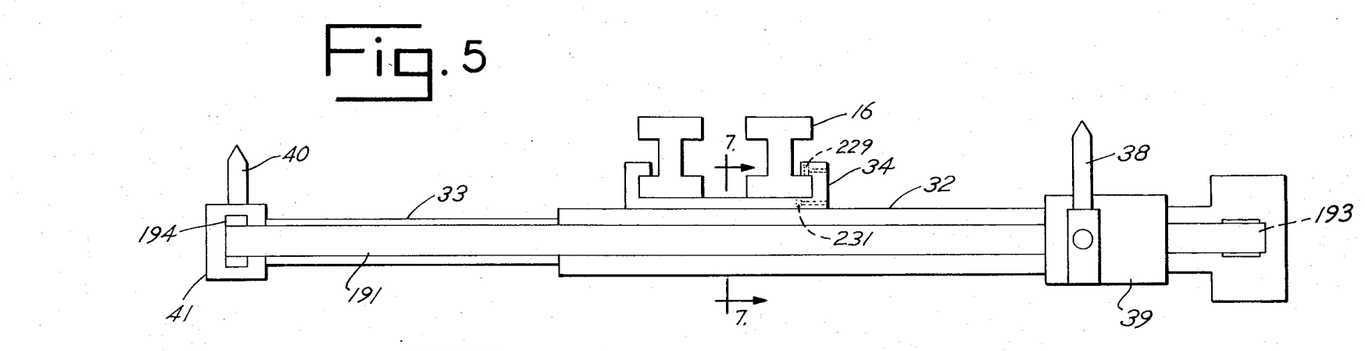
FIG. 5 is an enlarged side view of the longitudinal measuring bar member.
Figure 6:
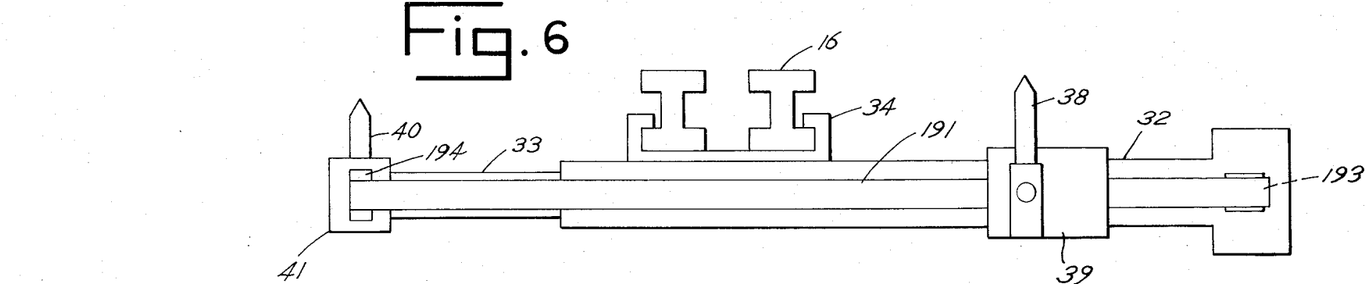
FIG. 6 is a side view similar to FIG. 5 wherein exemplary reference point indicators have been translated or moved with respect to the position shown in FIG. 5.
Figure 7:
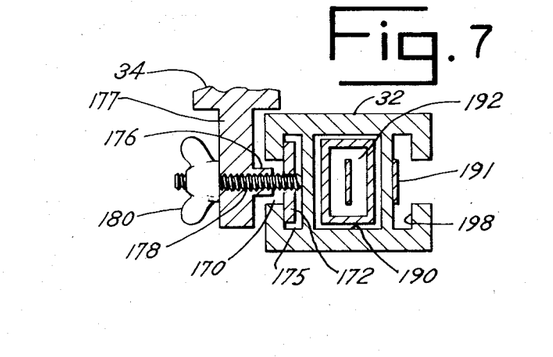
FIG. 7 is a cross sectional view of the longitudinally extending measuring bar member shown in FIG. 5.
Figure 8:
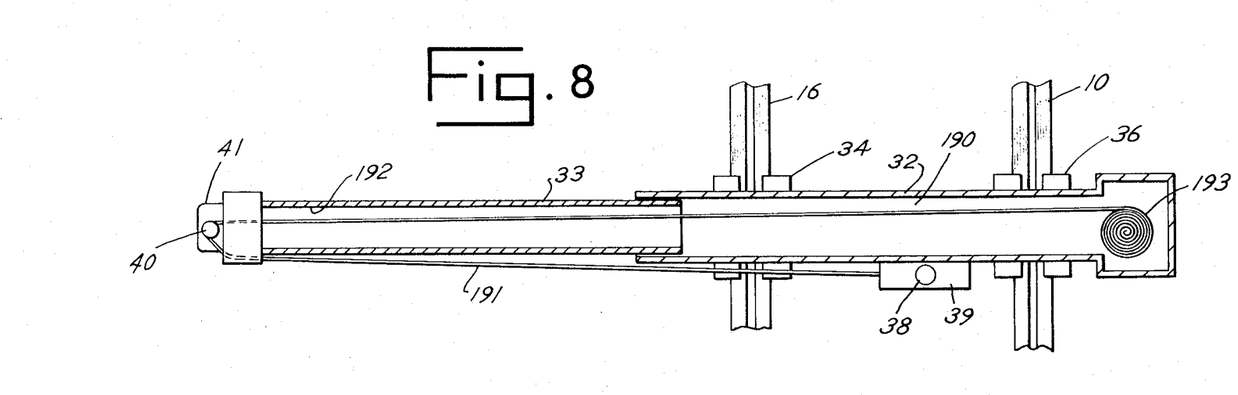
FIG. 8 is a schematic plan view of the longitudinally extending measuring bar member of FIG. 5.

As shown in FIGS. 5, 6 and 7, the longitudinal bar 33 is telescopically fitted within a compatible passage 190 defined in the interior of the bar 32. A sliding tape 191 which is dispensed from a storage roll 193 at one end of the bar 32 extends through a center or longitudinal passage 192 in the bar 33 and over a roller 194 aligned with an index pointer 40 at the forward end of the telescoping bar 33. The tape 191 then connects through a slot 198 to a second pointer 38 which is slidably attached to the bar 32. Thus, the free end of tape 191 is attached to the pointer 38. In operation the pointer 38 is aligned with a desired reference point on the vehicle 15 to thereby establish a zero reference point. The second reference pointer 40 is then positioned by movement of bar 33. The distance between the points 38, 40 associated with the bars 32, 33 is then directly read from tape 191. Note pointer 38 is adjustably mounted for vertical movement in a bracket 39 attached to bar 32. Pointer 38 includes scales to measure the position of a reference point relative to a datum plane 18. Additionally, the pointer 38 may be aligned with a point associated with a plane 19. The forward pointer 40 mounted in a pivotal or rotatable bracket 41 may then be aligned with a desired reference point by sliding movement of telescoping bar 33, pivotal movement of pointer 40 in bracket 41, transverse movement of bar 32, and extension of pointer 40 in bracket 40. The deviation of the forward pointer 40 can then be determined by reference to the scales on tape 191, tapes 102, 107 and pointer 40. The scale measurement on tape 191 may represent the distance from a point or from some reference plane 19. The measurement on tape 102 for example will be indicated by a pointer 103 in FIG. 4 attached to the middle of body 179 of bracket 34. This measurement represents the distance from plane 12 or axis 14.

In sum, movement of the bar 32 on bars 10, 16 and movement of the pointer 40 by extension of bar 33 as well as pointer 38 by sliding on bar 32 permits point to point measurement, and plane to point measurement of all reference points at the lower frame or under body of a vehicle 15. Importantly these measurements can be made easily and quickly once the framework is initially "set" with respect to known points of the vehicle. That is, certain reference points of the vehicle which is to be repaired are known or presumed to be associated with undamaged portions of the vehicle 15. The framework is initially attached to the vehicle 15 and aligned with respect to these known reference points. Then all other points on the vehicle can be measured to determine their deviation from proper position, and the vehicle can be repaired by the equipment 17 merely by eliminating the measured deviations.

Supplemental Measuring Apparatus

Supplemental measuring apparatus may be mounted on any of the bars for measuring positions of reference points on a vehicle 15. Of particular utility is the supplemental apparatus which comprises a vertical measuring bar 58 having a slidable clamp or plate 60 at the base thereof. The slidable clamp or plate 60 includes a slot 65 compatible with the flange construction previously described for longitudinal fixed bars 46, 48. The vertical plate or bar 58 includes scales thereon for measuring a distance from a datum plane 18 associated with the transverse bars 10 and 16 and a point on the vehicle 82. Pointer constructions, such as pointer rod 64, slidably cooperate with the vertical measuring bar 58. Pointer rods may be clamped and moved to various positions to further locate reference points and to specifically measure those reference points, for example on opposite sides of a vehicle relative to each other or with respect to information provided in standard reference repair books.

The upper body measurements of the vehicle may be taken by utilization of vertical measuring bars in cooperation with a transverse rod or bar 70 which is attached by clamps 77, 74 to the vertical measuring bars 66, 68. Again, all of the measuring bars include scales thereon to facilitate measurement. All of the various measuring bars include clamps which are adaptable to receive pointers and measuring rods to indicate the distance of points relative to known positions, i.e. points or planes.

Variations in Construction

As previously disclosed, it is possible to devise any of a number of types of brackets or clamps for attachment of the transverse bars to a vehicle, to a platform for the vehicle or to clamps supporting the vehicle. It is also possible to alter the construction of the measuring apparatus by mounting the slidable brackets or trolley brackets on top of the transverse members 10 and 16. Additional brackets and pointers may be provided on the longitudinal measuring bars 32, 33. The forward pointer 40 of the longitudinal bar assembly as shown in FIG. 5 as described may be rotatable with respect to the longitudinal axis 14. In this way, straight line distances from a particular reference point as well as a plane can be easily established.

Method of Operation

When operating the measuring system of the present invention, initially the transverse bars 10 and 16 are affixed in space with respect to reference points and planes of a vehicle which are known not to be damaged. For example, various reference points at the rear end of the vehicle may be undamaged and may be in appropriate position. Transverse bars 10, 16 are maintained by attachment with brackets, eg. 24, and clamps, eg. 84, to establish a generally horizontal datum base 18 from which measurements may be taken vertically upward to additional reference points on the vehicle. When determining these reference points, their location and dimension, reference to standard manufacturers reference publications on the subject is utilized.

As a next or subsequent step, the longitudinal bar assembly 32, 33 which is slidably mounted on the transverse bars 10, 16 is arranged in proper position. This longitudinal bar assembly 32, 33 can be utilized to measure a number of points on the vehicle. Before the longitudinal bar assembly 32, 33 is utilized, however, it is recommended that the supplemental or additional longitudinal bars 46, 48 be attached to the transverse bars 10, 16 in order to improve the structural integrity of the measuring system. These bars 46, 48 should provide for a rectangular framework upon which the slidable longitudinal bar assembly 32, 33 will move. The various other supplemental components including the upper body components may then be added or removed from the framework as needed in order to measure the various reference points on the vehicle and to compare reference points on opposite sides of the vertical plane 12.

Thus, while there has been set forth a preferred embodiment of the invention, the invention is to be limited only by the following claims and their equivalents.

What is claimed is:

1. Improved apparatus for measuring the location of selected reference points on a vehicle relative to other selected reference points on a vehicle or reference planes associated with said vehicle, said vehicle of the type having a longitudinal axis extending from the front to the back of the vehicle, said apparatus comprising, in combination:
    a first transverse bar member;
    means for fixing the first bar member to the vehicle substantially transverse to the longitudinal axis of the vehicle;
    a second transverse bar member;
    means for fixing the second bar member to the vehicle substantially transverse to the longitudinal axis of the vehicle, parallel to and spaced generally horizontally from the first bar member in a common, generally horizontal plane;
    a longitudinally extending measuring bar positioned to extend generally parallel to the longitudinal axis of the vehicle and perpendicular to the first and second transverse bar members, said measuring bar including a first longitudinal member telescopically and slidably receiving a second longitudinal member and including indicating means for measuring the telescoped position of the second longitudinal member relative to the first member;
    mounting means for slidably mounting the measuring bar simultaneously on both transverse members, said mounting means including means for maintaining the measuring bar continuously movable and slidable as a unit toward and away from the longitudinal axis while remaining at all times substantially parallel to the longitudinal axis and generally perpendicular to the transverse members to define a rigid framework;
    first means for measuring the position of the measuring bar in the transverse direction relative to a known point on both of the transverse bar members; and
    said indicating means comprising a coiled tape measure with the end thereof extending from the first longitudinal member around a fixed point on the second longitudinal member and attached to the first member to form a loop which extends or retracts in response to telescopic extension or retraction of the second longitudinal member relative to the first member.

2. The apparatus of claim 1 wherein the transverse bars extend laterally from the longitudinal axis a distance equal to or greater than the lateral extension of a vehicle being measured by the apparatus.

3. The apparatus of claim 1 including alignment pins in said transverse bar members.

4. The apparatus of claim 1 including additional longitudinal bar members connecting the transverse members to define a rectangular frame.

5. A method for measuring locations of selected positions on a vehicle of the type having a longitudinal axis comprising the steps of:
    (a) mounting the vehicle rigidly in space;
    (b) attaching first and second transverse bar members in a fixed, substantially horizontal, coplanar relationship relative to the vehicle, substantially transverse to the longitudinal axis and spaced from one another;
    (c) slidably mounting a longitudinal measuring bar on the transverse bars perpendicular to the transverse bars, whereby the measuring bar is continuously slidably movable as a unit solely in a direction transverse to the longitudinal axis thereby maintaining the measuring bar substantially parallel to the longitudinal axis, said longitudinal measuring bar also including means for measuring positions in the longitudinal direction on the longitudinal measuring bar, said means for measuring including a measuring bar having a first longitudinal member telescopically and slidably receiving a second longitudinal member and including indicating means for measuring the telescoped position of the second longitudinal member relative to the first member, said indicating means comprising a coiled tape measure with the end thereof extending from the first longitudinal member around a fixed point on the second longitudinal member and attached to the first member to form a loop which extends or retracts in response to telescopic extension or retraction of the second longitudinal member relative to the first member;
    (d) positioning the measuring bar and attached means for measuring in alignment with various known, standard measurement positions on the vehicle; and
    (e) measuring the positions relative to the horizontal plane defined by the transverse bars or in a longitudinal direction from a vertical plane perpendicular to the longitudinal axis, or from a vertical plane containing the longitudinal axis, or to one another.

6. The method of claim 5 combination with the further step of straining parts of the vehicle to alter standard measurement positions, and remeasuring various positions subsequent to such straining whereby positions are altered to conform to a specification.

7. The method of claim 6 wherein the step of mounting the vehicle in space, includes the step of mounting the vehicle on frame straightening equipment.

* * * * *